Dec. 16, 1941.  W. G. MARTIN  2,266,609

ENAMELED TANK CONNECTION

Filed May 18, 1940

Wesley G. Martin
INVENTOR.

BY *[signature]*
ATTORNEY.

Patented Dec. 16, 1941

2,266,609

UNITED STATES PATENT OFFICE 2,266,609

ENAMELED TANK CONNECTION

Wesley G. Martin, Milwaukee, Wis., assignor to A. O. Smith Corporation, Milwaukee, Wis., a corporation of New York Application May 18, 1940, Serial No. 335,996

6 Claims. (Cl. 285—49)

This invention relates to a pipe connection for enameled tanks.

One of the problems which arises in the construction of domestic hot water tanks, or of other tanks interiorly lined with a vitreous enamel coating to prevent corrosion, is that of providing suitable fittings for the attachment of water pipes for the inlet and outlet of water. These fittings must be capable of attachment to the enameled tank without injury to the enamel lining and must be strongly and rigidly secured to avoid injury to the fitting, the tank, or its enamel lining when pipes are screwed into the fitting.

The primary object of this invention is to provide improved means for connecting pipes to a vitreous enameled tank.

Other objects of the invention will be clear from the accompanying detailed description and the drawing in which.

Figure 1:
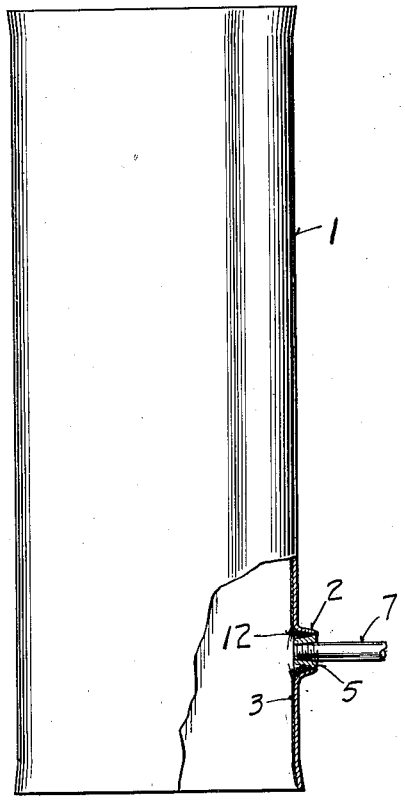
Figure 1 is an elevation, partly in section, of a shell for an enameled hot water tank provided with a water connection.
Figure 2:
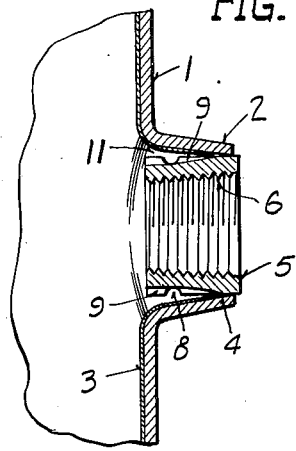
Fig. 2 is an enlarged section showing an opening in the tank with a bushing assembled in position preparatory to welding.
Figure 3:
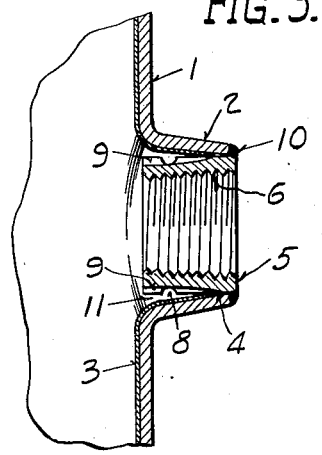
Fig. 3 is a section after the bushing has been welded in place.
Figure 4:
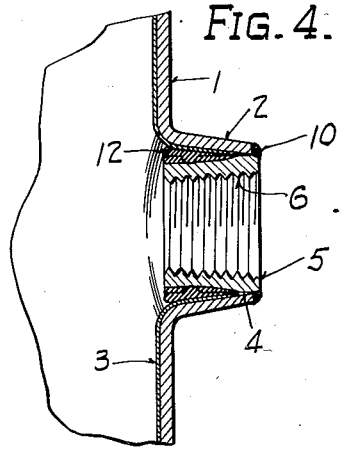
Fig. 4 is a section after the calking or sealing material has been applied.

In constructing a tank in accordance with this invention, a shell 1 is fabricated with an outwardly extending flange or collar 2 at each opening provided for connection to water pipes. The flange 2 is tapered so as to be larger in diameter at the shell than at its outer extremity. Vitreous enamel frit is then applied to the interior of the shell and the flanges formed around the openings and fused in place to form an enameled lining 3. Before fusion of the enamel frit to the shell it is desirable to wipe away the frit on the interior of the flange 2 for a short distance from the outer end so as to leave a short space 4 uncovered with enamel. It is found that the subsequent welding of the bushing to the flange is facilitated if the enamel lining on the interior of the flange does not extend all the way to the end where the weld is to be made.

After the tank has been enameled, a bushing 5 of suitable metal to resist corrosion is inserted in the flange 2 from the inside of the shell which is readily accessible through the open ends. The bushing is of such diameter as to fit closely in the outer end of the flange or collar 2, and has internal screw threads 6 to make connection with the water pipe 7. The bushing may be cylindrical on its outer surface, or preferably, as shown in the drawing, may be provided with an annular groove 8 extending around the bushing and a plurality of tapering grooves 9 extending longitudinally for the purpose of more effectually locking the sealing material in position.

The bushing is then welded in place by the deposition of weld metal 10. When suitable welding methods are employed the heat produced during the welding operation travels inward on the flange for only a short distance and causes no damage to the enamel lining 3. The bushing is tightly and rigidly held in place by the weld.

After the welding has been completed, the annular space 11 between the inner end of the bushing and the flange or collar 2 is filled with sealing material 12. This may be any suitable cement or plastic material resistant to corrosion and to the effects of hot and cold water, or a low melting alloy such as solder or type metal. When a fusible alloy is used, it is preferred to employ a bushing which has been tinned on its outer surface so that the fusible alloy will readily adhere to it, and the alloy is preferably of such characteristics that it expands slightly upon solidification so as to tightly fill the space between the bushing and the flange.

There are numerous alloys of such low fusion point that the enamel lining is not injured when the bushing and surrounding parts are heated up to the melting point of the alloy and either molten or solid alloy is applied to fill the annular space between the flange and the inner portion of the bushing. While it is preferred to have the alloy melted so that it may completely fill the space, it is also possible to operate in the cold and calk the opening between the flange and bushing by pressing a soft metal into place. In this way the part 4 of the flange which is not covered with enamel is sealed off from direct contact with the liquid inside the tank. Even though the seal may not be perfectly water tight, the path for circulation of water is long and narrow and corrosion of the unenameled portion of the flange is effectually prevented. Since the outer end of the bushing is fastened to the outer end of the flange by the weld and the inner end is supported by the sealing compound, a very strong and rigid connection is obtained.

While the description has been directed specifically to the provision of a fitting on the shell of a tank, it is apparent that a similar construction can be employed for making connections to either one or both heads. After the shell and heads have been completed and provided with the necessary fittings, they are assembled and secured together by methods which form no part of this invention.

The invention is claimed as follows:

1. In an interiorly lined tank, a flange extending outwardly around an opening in the tank and tapered to decrease in diameter towards the outer end of the flange with the lining extending unbroken over the inner surface of the flange to a circumferential line near its outer end, a bushing positioned within the flange and welded at its outer end to the outer end of the flange, and a sealing compound cast in an annular space between the inner portion of the lining of the bushing and the flange.

2. In an interiorly lined tank, a flange extending outwardly around an opening in the tank and tapered to decrease in diameter towards the outer end of the flange with the lining extending unbroken over the inner surface of the flange except for a circumferential area near its outer end, a bushing positioned within the flange and welded at its outer end to the outer end of the flange, and a ring of low melting point alloy cast between the inner portion of the bushing and the lining of the flange.

3. In an interiorly lined tank, a flange extending outwardly around an opening in the tank and tapered to decrease in diameter towards the outer end of the flange with the lining extending outwardly over the inner surface of the flange, a bushing positioned within the flange and welded at its outer end to the outer end of the flange, and a ring of low melting point alloy which expands upon solidification cast between the inner portion of the bushing and the lining of the flange.

4. In an interiorly lined tank, a flange extending outwardly around an opening in the tank and tapered to decrease in diameter towards the outer end of the flange with the lining extending outwardly over the inner surface of the flange, a bushing positioned within the flange, weld metal uniting the outer ends of the flange and bushing, and a ring of easily fusible alloy surrounding the inner portion of the bushing in the space between it and the lining of the flange.

5. In an interiorly enameled tank, a flange extending outwardly around an opening in the tank with the enamel tank lining extending outwardly over the inner surface of the flange, a bushing positioned within the flange, weld metal uniting the outer ends of the flange and bushing, and sealing material cast in the space between the flange and bushing.

6. In an interiorly enameled tank, a flange extending outwardly around an opening in the tank with the enamel tank lining extending outwardly over the inner surface of the flange, a bushing positioned within the flange and having an annular groove and a longitudinal groove on its outer surface, and sealing material cast in the space between the flange and bushing and interlocked with said bushing by means of said grooves.

WESLEY G. MARTIN.